United States Patent

Mollring

[11] 3,866,933
[45] Feb. 18, 1975

[54] SNOWMOBILE SKI GUIDE
[75] Inventor: Frederick Jay Mollring, Jackson, Wyo.
[73] Assignee: Mollring Snoglide, Inc., Jackson, Wyo.
[22] Filed: Mar. 23, 1973
[21] Appl. No.: 344,174

[52] U.S. Cl. .................................. 280/28, 180/5 R
[51] Int. Cl. ............................................. B62b 17/08
[58] Field of Search ................ 280/28, 21; 180/5 R

[56] References Cited
UNITED STATES PATENTS
2,741,487  4/1956  Carefoot .............................. 280/28
3,115,074  12/1963  Smith ................................. 280/28 X
3,711,109  1/1973  Hofbauer ............................ 280/28

Primary Examiner—David Schonberg
Assistant Examiner—Michael J. Forman
Attorney, Agent, or Firm—Wells, St. John & Roberts

[57] ABSTRACT

Accessory guides for the steerable skis of a snowmobile or other vehicle. The guides comprise yieldable upright blades projecting through longitudinal center slots along the skis. A spring yieldably urges each blade downwardly through the slot of the respective ski. The side edges of the blade are positioned in the snow or ice to exert lateral forces in turns or on sidehill slopes to provide improved control steering characteristics for the vehicle.

7 Claims, 7 Drawing Figures

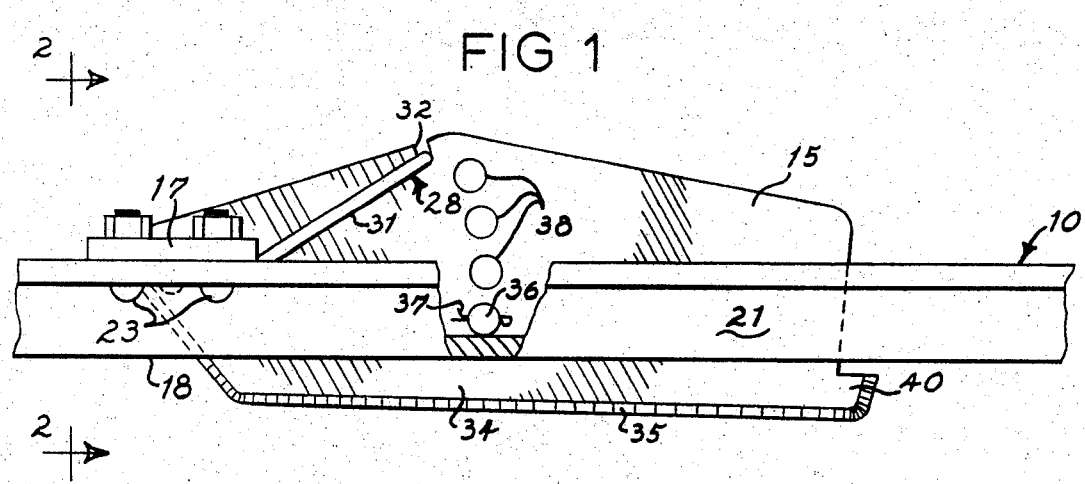
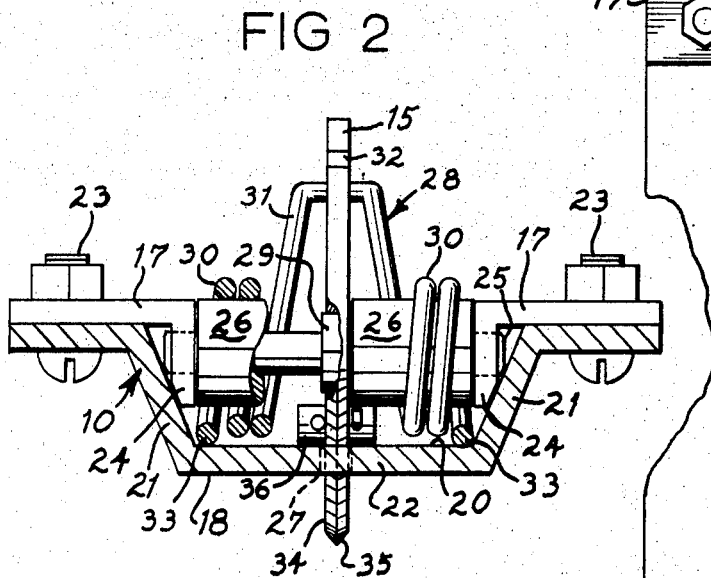
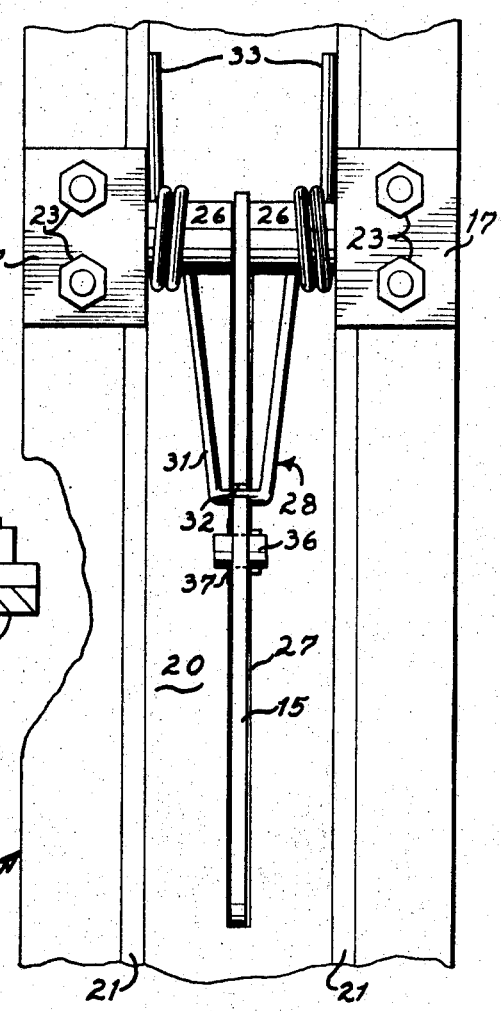

SNOWMOBILE SKI GUIDE

BACKGROUND OF THE INVENTION

The present invention relates generally to guides for skis, and specifically to guides for the forward steering and support skis of a snowmobile or similar vehicle. A conventional snowmobile has one or two endless rear tracks with transverse lugs for power and traction in snow or on ice. Steering is accomplished by a pivoted ski assembly at the forward end of the vehicle, typically including a pair of parallel skis. It is well known that all skis require a longitudinal guide in the form of a groove or skag running along the length of the ski to maintain the ski in a straight path, to aid in combatting side slip of the ski, and to permit controlled turning. In the snowmobile industry, most skis are formed with a downwardly-indented longitudinal well along the center of the ski and with replaceable longitudinal skags mounted beneath the well. Conventional skags are usually in the form of a tubular member or pipe.

One problem with a fixed skag is that its depth is not adjustable for terrain conditions. A snowmobile might be operated on alternating patches of ice and soft snow, and no provision is normally made for modification of the ski assembly to meet these conditions. The downward projection of the ski guide surfaces necessary for safe operation in soft powder snow is not necessarily suitable for operation of the vehicle on solid ice, as on a frozen lake. In practice, manufacturers and users have had to compromise to provide skis that project downwardly an average depth and which seldom meet the requirements of the particular terrain on which the vehicle is used.

Prior patents have disclosed steering devices for skis. The Romsdal U.S. Pat. No. 3,166,338 shows a ski with a fixed skag and means for raising or lowering one end of the ski in an attempt to meet snow conditions. A yieldable rudder in the form of an upright blade on a sled is shown in the Casadei U.S. Pat. No. 3,510,144 and a related rudder at the rear of the snowmobile is shown in the Lange Patent 3,550,707. Yieldable blade rudders on sleds are generally shown in the Bennett U.S. Pat. No. 1,160,130. A forward movable blade is shown on a sled in the Hallock U.S. Pat. No. 1,090,052.

None of the above patents are directed to the use of a movable upright blade along the center of a steerable ski. The present blade is not a "rudder" in that it is not located at the rear of the vehicle and is not used for turning of the vehicle independent of the support ski on which it is mounted. Instead, the present disclosure and invention are concerned with a yieldable guide blade extending through a conventional ski to assure proper transverse loading of the ski when used for steering purposes in its conventional manner. The desirability and advantages of this assembly will be evident from the following disclosure.

SUMMARY OF THE INVENTION

The guide assembly comprises brackets which mount a pivot pin across the upper surface of a ski above a longitudinal center slot extending through the ski. A narrow elongated blade is mounted to the pivot pin and extends downwardly through the slot. Yieldable means engages the blade to urge it downwardly, while permitting it to be moved upward through the slot in response to the hardness of the supporting terrain material.

It is a first object of this invention to provide an improved guide accessory for a conventional ski such as those used on snowmobiles or similar vehicles. It does not require redesign of the ski or substitution of a different ski from that conventionally provided by the vehicle manufacturer. It can be manufactured as an independent accessory and mounted to existing equipment or can be manufactured integrally with the ski assembly.

Another object of this invention is to provide an upright guide along a ski with provision for yieldable upward movement of the guide as required by terrain conditions.

Another object of this invention is to provide such an accessory wherein the blade can be readily replaced without requiring replacement of the entire ski or supporting apparatus.

These and other objects will be evident from the following disclosure, taken together with the accompanying drawings, which show a preferred form of the invention as well as an alternate form thereof.

DESCRIPTION OF THE DRAWINGS

FIG. 1 is a fragmentary side view of the center portion of a ski provided with the guide accessory, portions of the ski being broken away;

FIG. 2 is a cross sectional view taken along line 2—2 in FIG. 1;

FIG. 3 is a top view of the assembly shown in FIG. 1, turned 90° and with portions of the ski broken away;

DESCRIPTION OF THE PREFERRED EMBODIMENTS

Figure 4:
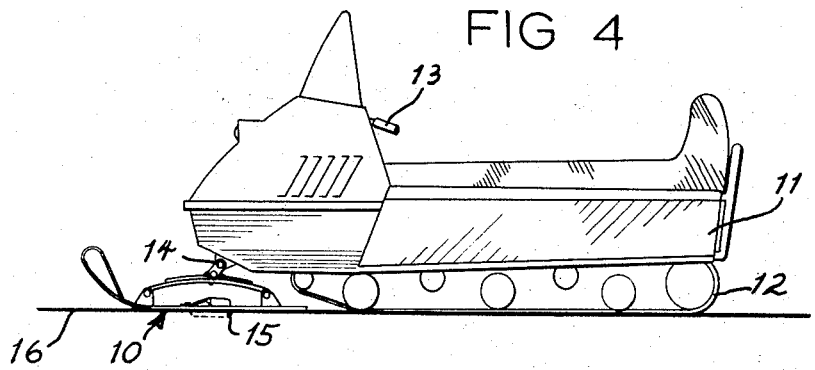
FIG. 4 is a side elevation view of a snowmobile equipped with the accessory guide.

The accessory guide which is the subject of this disclosure is best understood by a study of the preferred embodiment shown in FIGS. 1-4. It relates to a longitudinal guide at the center of each of the forward steering and support skis 10 of a snowmobile 11 or other vehicle, whether powered or not. No modification is intended in the snowmobile structure itself, which conventionally includes an endless driving and support track assembly 12, and handlebars 13 by which the paired skis 10 are turned for steering purposes. The present guide assembly is located longitudinally beneath the turning axis of the center pivot bar 14 that connects the two parallel skis and transmits turning forces to them. As can be seen in FIG. 4, the guide comprising blade 15 is relatively short in relation to the length of the skis 10, and projects beneath the lower surface of each ski 10 into the supporting snow or ice surface, indicated at 16.

The details of the accessory guide are seen in FIGS. 1-3, which illustrate the guide as mounted on a typical ski for snowmobiles. The ski has an outer or lower surface 18 and an upper or inner surface 20. It includes a longitudinal well formed along the length of ski 10 and defined by downwardly inclined walls 21 and a central horizontal wall 22. Such skis conventionally have attached to them a replaceable skag (not shown) in the form of a pipe or tube fixed to the ski at each end and located immediately beneath the lower surface 18 along the center line of the ski. When using the present improvement, this conventional skag is removed from the ski.

The accessory guide is mounted to the ski by a pair of brackets 17 fastened by bolts 23. Brackets 17 are mounted in opposed relation to one another and each has downwardly depending ears 24 extending into the well alongside the inclined walls 21. A pivot pin 25 is supported between the ears 24 through mounting apertures which receive pin 25 at each side of the ski.

Blade 15, which is relatively thin and made of steel or other suitable hard metal material, is pivotally mounted to pivot pin 25 by means of a transverse aperture formed through blade 15 and mounting a bushing 29 of bearing material. Bushing 29 is pivotally supported on the pin 25. Blade 15 is free to pivot relative to pin 25 about the transverse central axis through pin 25. Blade 15 is centrally located along pin 25 by a pair of spacer collars 26 extending between the respective surfaces of blade 15 and the ears 24 of brackets 17.

Blade 15 extends rearwardly from pin 25 and protrudes downwardly through a longitudinal slot 27 formed through the center horizontal wall 22 at the bottom of the ski well. The width of the slot 27 is slightly greater than the width of blade 15. Blade 15 is biased downwardly through slot 27 by means of a coiled spring assembly indicated generally at 28. The spring assembly 28 includes a pair of coiled sections 30 each wrapped about the pin 25 and collars 26. The coiled sections 30 terminate at an integral center arm 31 that bears downwardly on blade 15 and is received within an upper notch 32 on the blade. Integral outer arms 33 at the ends of the coiled sections 30 bear downwardly on the upper surface of the horizontal wall 22 along the well of the ski. The spring assembly, when mounted on a ski, is initially tensioned to exert downward force on the blade at all times.

The blade itself includes a lower portion 34 beneath the ski, having beveled lower edges 35 to assist in penetration of snow or ice by the blade. It includes an upper stop to limit downward movement of the blade through the slot 27. This is shown as a removable pin 36 protruding to both sides of the blade 15. The pin 36 is greater in transverse width than the corresponding width of slot 27, and thereby abuts the upper surface 20 of the ski along the horizontal wall 22 when the downward limit of movement has been reached as shown in FIG. 1. Pin 36 is illustrated as being releasably held in place by a keeper or conventional cotter pin 37. By placing pin 36 in a selected plate aperture 38, one can readily limit the amount of maximum penetration of the supporting terrain by blade 15 and thereby match the requirements of the type of surface on which the vehicle is to be operated at any given time.

To assure that there is a minimum amount of extension of the blade 15, a tab or extension 40 is provided at the rear end of blade 15. It extends outwardly from the lower portion 34 of blade 15 in a plane configuration and protrudes rearwardly beyond the rear end of slot 27. It prevents the lower portion 34 of blade 15 from moving upwardly through the ski when operating on very hard surfaces.

In use, the pin 36 is set in an aperture 38 to permit the maximum surface penetration desired, judged by the user with respect to snow or ice conditions on a given day. In soft snow, greater penetration is desirable, while in hard packed snow or on ice, less penetration is required. The snowmobile is operated in the normal manner, and the blade 15 will be urged upwardly as the ski 10 moves over harder surface areas. However, there will always be a minimum penetration into the surface due to the tab 40, which maintains the lower portion of blade 15 below the ski surfaces.

In practice, the use of this penetrating sharp upright blade immediately below the turning axis of the ski assembly at each side of the snowmobile has been found to greatly increase the maneuverability and control of such vehicles, particularly on ice and hard packed snow surfaces. The blade 15 is particularly useful on sidehill slopes, since it opposes lateral sliding of the ski. Since the blade 15 is obviously subjected to wear, it is important that it be easily replaced, which can be accomplished readily by removal of the brackets 17 and replacement only of the blade 15 and possibly the bushing 29.

Figure 5:
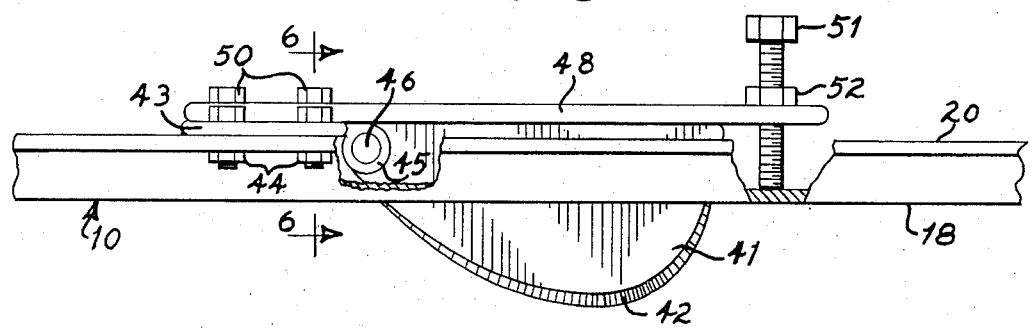
FIG. 5 is a view similar to FIG. 1, showing a second form of the invention.
Figure 6:
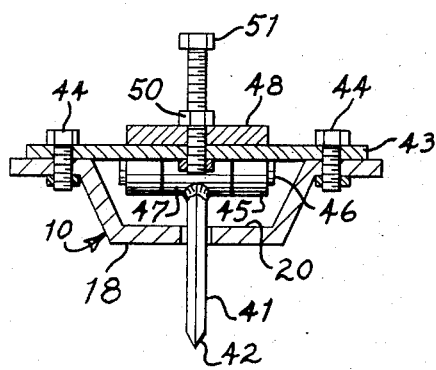
FIG. 6 is a cross-sectional view taken along line 6—6 in FIG. 5.
Figure 7:
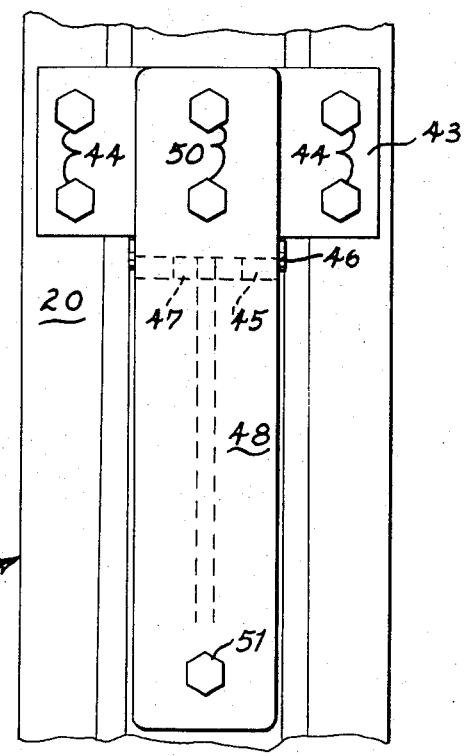
FIG. 7 is a top view of the assembly shown in FIG. 5, turned 90°.

FIGS. 5, 6 and 7 show a modification of the assembly, wherein the blade 41 has a somewhat different shape, being arcuate along its bottom beveled edge 42. Blade 41 is mounted to ski 10 by means of a transverse bracket or plate 43 secured by bolts 44 to the upper surface 20 of the ski 10. The rear end of bracket 43 includes integral collars 45 that mount a pivot pin 46 carrying blade 41. Blade 41 is shown as having an integral pivot collar 47.

In this form of the invention, blade 41 is biased downwardly by a flat leaf spring 48 anchored at its forward end by bolts 50 attached to the bracket or plate 43. The free outer end of spring 48 is provided with a limit bolt 51 threadably received through a lock nut 52 for adjustment relative to the spring 48. The bolt 51 limits downward movement of blade 41 to provide control of blade depth when operating on a snow or ice surface. In this form, the bolt 51 can be set so that the blade 41 is flush with the lower surface 18 of ski 10 and is inoperable. This might be desirable under some circumstances and might also be required for carrying of the snowmobile on a vehicle or trailer.

The operation of the two forms of the invention are essentially similar, both providing a relatively short effective guide blade along the center of the ski beneath the turning axis of the ski assembly.

Modifications can be made with respect to the physical details shown in the drawings, and it is to be emphasized that these details are presented only by way of illustration and are not intended to limit the scope of the invention, which is set out in the following claims.

Having thus described my invention, I claim:

1. An accessory for a vehicular ski of the type having a longitudinal central well extending along the length thereof and a longitudinal central slot formed through the bottom wall of the well beneath a turning axis of the ski; the accessory comprising:

bracket means adapted to be fixed to the ski at opposite sides thereof, including opposed support members adapted to fit into the well along the side walls thereof;

a pivot pin adapted to be carried by the respective support members of said bracket means at a location adjacent the forward end of the slot formed through the ski;

an upright blade pivotally mounted about the pivot pin and adapted to extend rearwardly therefrom when mounted on a ski, the blade being centered across the pin so as to be aligned with the slot of the ski and having a lower portion of the blade adapted to protrude through the slot;

yieldable means engageable with the blade adapted to urge the lower portion thereof downwardly when the accessory is mounted on a ski;

said blade further comprising a rearwardly projecting tab at the lower blade portion adapted to protrude rearwardly beyond the slot as an extension of the blade and adapted to limit upward pivotal movement of the blade relative to the ski by abutment of the tab against the bottom surface of the ski.

2. An accessory for a vehicular ski of the type having a longitudinal central well extending along the length thereof and a longitudinal central slot formed through the bottom wall of the well beneath a turning axis of the ski; the accessory comprising:

bracket means adapted to be fixed to the ski at opposite sides thereof, including opposed support members adapted to fit into the well along the side walls thereof;

a pivot pin adapted to be carried by the respective support members of said bracket means at a location adjacent the forward end of the slot formed through the ski;

an upright blade pivotally mounted about the pivot pin and adapted to extend rearwardly therefrom when mounted on a ski, the blade being centered across the pin so as to be aligned with the slot of the ski and having a lower portion of the blade adapted to protrude through the slot;

yieldable means engageable with the blade adapted to urge the lower portion thereof downwardly when the accessory is mounted on a ski;

said yieldable means including a coiled spring assembly having a pair of tensioned coil sections wrapped about the pivot pin at opposite sides of the blade together with an integral center spring arm in engagement with the blade and integral outer spring arms adapted to engage the bottom wall of the well when the accessory is mounted on a ski.

3. An apparatus as set out in claim 2 further comprising:

upper stop means protruding to both sides of the blade beyond the slot width for engaging the bottom wall of the well to limit downward extension of the blade through the slot in response to the spring assembly.

4. An apparatus as set out in claim 3 wherein the blade has a plurality of apertures formed through it at differing elevations from its lower edge;

said upper stop means comprising a pin removably mounted to the blade through a selected one of said apertures dependent upon the amount of blade extension desired through the slot.

5. In combination with a ski adapted to be mounted to a snow vehicle:

a pivot pin mounted across the top surface of the ski intermediate the ends of the ski about a transverse horizontal axis;

an elongated vertical blade mounted to said pivot pin for movement of the blade about said axis;

said blade partially protruding through a complementary open slot formed through the ski;

means for yieldably urging the blade downwardly through the slot relative to the ski;

and stop means located on said blade beneath the ski for abutting the ski to thereby limit upward motion of the blade through the slot.

6. In combination with a ski adapted to be mounted to a snow vehicle:

a pivot pin mounted across the top surface of the ski intermediate the ends of the ski about a transverse horizontal axis;

an elongated vertical blade mounted to said pivot pin for movement of the blade about said axis, said blade extending rearwardly from the pivot pin in a direction opposite to the intended forward direction of movement of the vehicle;

said blade partially protruding through a complementary open slot formed through the ski rearwardly of the pivot pin;

and means for yieldably urging the blade downwardly through the slot relative to the ski.

7. In combination with a ski adapted to be mounted to a snow vehicle:

a pivot pin mounted across the top surface of the ski intermediate the ends of the ski about a transverse horizontal axis;

an elongated vertical blade mounted to said pivot pin for movement of the blade about said axis;

said blade partially protruding through a complementary open slot formed through the ski;

a tension coil spring assembly wrapped about the pivot pin and bearing against both the upper ski surface and the upper edge of the blade, said tension coil spring assembly yieldably urging the blade downwardly through the slot relative to the ski.

* * * * *